METHOD OF MAKING SUPERCONDUCTING CYLINDERS FOR FLUX DETECTORS

Filed July 14, 1969

INVENTORS.
John M. Goodkind
David L. Stolfa
BY Roland A. Anderson
ATTORNEY.

United States Patent Office 3,591,474

Patented July 6, 1971

3,591,474

METHOD OF MAKING SUPERCONDUCTING CYLINDERS FOR FLUX DETECTORS

John M. Goodkind, Del Mar, and David L. Stolfa, La Jolla, Calif., assignors to the United States of America as represented by the United States Atomic Energy Commission Filed July 14, 1969, Ser. No. 841,347
Int. Cl. B23p *1/00;* C23b *1/00*
U.S. Cl. 204—143R 8 Claims

ABSTRACT OF THE DISCLOSURE

A method of making superconducting cylinders of the "weak link" type is provided. The method allows the weak link to be made much smaller than was heretofore possible, thereby greatly increasing sensitivity and operating temperature range when the cylinder is used in a flux detector. The resistance of the weak link is monitored continuously as metal is removed from the link by electrochemical action.

BACKGROUND OF THE INVENTION

This invention relates to superconducting magnetometers and more particularly to a method of making specially formed metal cylinders for use in such devices.

Prior to our invention, metal cylinders containing so-called "weak links," as shown in FIG. 1, were produced by simply cutting longitudinally through the cylinder wall from each end toward the center, leaving a "bridge" between the two cuts. Heretofore the bridges could not be made smaller than about several microns wide. Such cylinders in magnetometers could operate only very close to the critical temperature of the metal. It is desirable to have a device which can operate not only near the critical temperature, but also throughout a range of temperatures below the critical temperature.

SUMMARY OF THE INVENTION

It is accordingly an object of our invention to provide a very sensitive magnetic flux detector utilizing weak link cylinders. It is another object to provide a detector of the type described which is operable throughout a range of temperatures below the critical temperature. Further objects will be apparent from reading the description to follow.

Our invention allows the weak link of the superconducting metal cylinder to be made very small, less than one micron in width. Our method provides a controlled etching process with simultaneous monitoring of the electrical resistance of the link.

DETAILED DESCRIPTION

The first step in our process is to place a thin film of the desired superconducting metal on an appropriate substrate. The metal may be any superconducting metal, such as niobium, lead, tin or aluminum. For a substrate we have used Pyrex or sapphire rods. Any dielectric with relatively small expansion coefficient will work. It is desirable to use a material with a small magnetic susceptibility. The substrate may be in the form of a solid or hollow rod. We have used solid rods between .010 and .040 inch in diameter and up to one inch in length.

The film is placed on the substrate by vapor deposition and should be as thin as possible. A thickness of 1000 to 2000 A. has been found to be appropriate.

The next step is to coat the film with a thin (1–3 microns) coating of insulating material. The insulating material must be insoluble in water but readily soluble in some other solvent. We have found that collodion works well as the insulating material.

Figure 1:
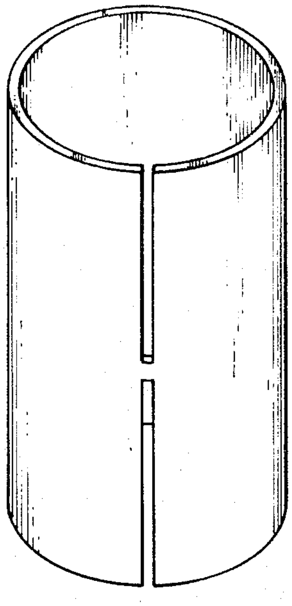
FIG. 1 illustrates a weak link cylinder for use in a flux detector.

A cut is then made through the wall of the coated metal cylinder leaving an uncut portion or bridge near the center, as shown in FIG. 1. The bridge should be as small as practicable without danger of cutting completely through it.

Part of the metal from the bridge is then removed making the bridge much smaller, while simultaneously monitoring its electrical resistance. The metal removal is accomplished in the following manner, referring to FIG. 2. The metal cylinder 1 is slit longitudinally at 2 along the back, thus making the cylinder into two halves connected only by the bridge 3. A positive electrode is attached to the metal film and a drop of demineralized water is placed over the bridge 3. A negative electrode (cathode) 4 comprising a small point made of the same metal as that of the cylinder, is inserted in the water drop. A voltage is applied between the electrodes to produce an initial current of about $10^{-4}$ amperes. The metal begins to etch along its edges under the insulation. The insulation (not shown) serves to prevent any etching from a direction perpendicular to the cylinder surface, since such etching is difficult to control. The current should gradually be lowered during the etching, to a final value of about $5\times10^{-7}$ amperes, in order to control the process as the bridge gets smaller.

Figure 2:
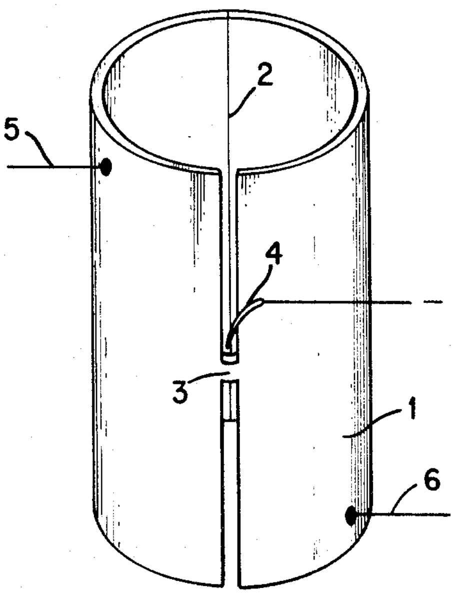
FIG. 2 illustrates such a cylinder during the shortening of the bridge according to the process of our invention.

The resistance monitoring process utilizes an AC resistance bridge (not shown) operated at 400 c.p.s. so as to avoid interference between the measurement step and the metal removing step. Connections for the resistance measurement are shown in FIG. 2. Bare wires 5 and 6 were laid on the metal of the cylinder before coating with the insulation. Silver paint was brushed over wires 5 and 6 to assure good electrical contact with the cylinder. The slit 2 eliminates the back of the cylinder as a possible current path in the monitoring process. The resistance being monitored is therefore the path across bridge 3 between wires 5 and 6.

The resistance of the bridge 3 varies inversely with its cross-section. We have found that the final resistance value in the case of lead can be made as high as 200 ohms, although a value as low as 70 ohms will still produce excellent results. These resistance values are based on an initial reading, before etching, of 7–8 ohms which is primarily contact resistance. Thus a final resistance of at least ten times the initial reading should be obtained.

After the bridge 3 is reduced to the desired size, metal is again evaporated to fill in the slit 2 so that the cylinder is once again integral.

The use of hollow metal cylinders with a weak link configuration in a magnetic flux detector is known to those skilled in the art, and is described in the Proceedings of the Symposium on the Physics of Superconducting Devices, held Apr. 28–29, 1967, at the University of Virginia, Charlottesville, published by Clearinghouse for Federal Scientific and Technical Information, Springfield, Va., pages U–1—U–7. Our invention is the process of making greatly improved cylinders for such use. With our process the weak link can be made very small in width, of the order of $\frac{1}{10}$ micron. The magnetic sensitivity of the flux detector in which such a cylinder is used is increased significantly. Further, the use of cylinders made according to our invention permits operation of the detector at any temperature below the critical temperature of the metal used.

We claim:

1. A method of making a superconducting metal cylinder for a magnetic flux detector, comprising the steps of:
(a) evaporating a thin film of a superconducting metal on a cylindrical substrate;
(b) coating the film with an insulating material;
(c) cutting the coated film to form a bridge therein;
(d) reducing the size of the bridge by controlled electrical etching; and
(e) monitoring, simultaneously with said reducing step, the electrical resistance of the bridge.

2. The method of claim 1 wherein the superconducting metal is lead.

3. The method of claim 1 wherein the superconducting metal is tin.

4. The method of claim 1 wherein the superconducting metal is aluminum.

5. The method of claim 1 wherein the superconducting metal is niobium.

6. The method of claim 2 wherein the insulating material is collodion.

7. The method of claim 6 wherein the metal film thickness is between 1000 and 2000 A.

8. The method of claim 7 wherein the reducing step comprises:

(a) placing a drop of demineralized water on the bridge;
(b) attaching a positive electrode to the metal film;
(c) placing a negative electrode in the water drop;
(d) passing a current of between $10^{-4}$ amperes and $5\times10^{-7}$ amperes through the water drop and the bridge until the resistance of the bridge is between 70 and 200 ohms.

References Cited

UNITED STATES PATENTS

| | | | |
|---|---|---|---|
| 2,092,133 | 9/1937 | Neumann | 204—143 |
| 2,590,927 | 4/1952 | Brandt et al. | 204—143 |
| 2,863,796 | 12/1958 | Theodosopoulos | 204—143 |
| 3,174,920 | 3/1965 | Post | 204—143 |
| 3,282,821 | 11/1966 | Cistola | 204—141 |

HOWARD S. WILLIAMS, Primary Examiner

T. TUFARIELLO, Assistant Examiner

U.S. Cl. X.R.

204—141